United States Patent [19]

Ishida et al.

[11] Patent Number: 4,817,750
[45] Date of Patent: Apr. 4, 1989

[54] RUNNING CONTROL SYSTEM FOR CONVEYOR CART

[75] Inventors: Hideo Ishida; Susumu Moriya, both of Kasugai; Takuo Taya, Komaki; Hiroshi Shimokata, Inuyama, all of Japan

[73] Assignee: 501 Daifuku Co., Ltd., Osaka, Japan

[21] Appl. No.: 46,871

[22] Filed: May 4, 1987

[30] Foreign Application Priority Data

May 9, 1986 [JP] Japan ................... 61-107506
Jun. 9, 1986 [JP] Japan ................... 61-133229
Jun. 9, 1986 [JP] Japan ................... 61-133227
Jun. 9, 1986 [JP] Japan ................... 61-87716[U]
Oct. 3, 1986 [JP] Japan ................... 61-236641
Feb. 6, 1987 [JP] Japan ................... 62-16771[U]

[51] Int. Cl.⁴ .................................. G05D 1/03
[52] U.S. Cl. ............................ 180/168; 318/587; 364/447
[58] Field of Search ............ 180/167, 168, 169; 318/587; 340/905, 908; 364/424, 447

[56] References Cited

U.S. PATENT DOCUMENTS

| 3,474,877 | 10/1969 | Wesener | 180/168 |
| 3,575,255 | 4/1971 | Wickstrom | 180/168 |
| 3,609,678 | 9/1971 | Fayling | 180/167 |
| 3,881,568 | 5/1975 | Ando et al. | 180/168 |
| 4,284,160 | 8/1981 | Deliban et al. | 180/168 |
| 4,322,670 | 3/1982 | Taylor | 318/587 |
| 4,530,056 | 7/1985 | MacKinnon | 180/168 |
| 4,602,334 | 7/1986 | Salesky | 180/168 |
| 4,711,316 | 12/1987 | Katou et al. | 318/587 |

FOREIGN PATENT DOCUMENTS

| 0012554 | 6/1980 | European Pat. Off. |
| 0050101 | 4/1982 | European Pat. Off. |
| 2064811 | 7/1972 | Fed. Rep. of Germany |
| 2462403 | 10/1979 | Fed. Rep. of Germany |
| 3134749 | 6/1982 | Fed. Rep. of Germany |
| 3513389 | 10/1986 | Fed. Rep. of Germany |
| 2336726 | 7/1977 | France |
| 0202514 | 11/1984 | Japan ................ 318/587 |
| 0218514 | 12/1984 | Japan ................ 318/587 |
| 0157612 | 8/1985 | Japan ................ 318/587 |
| 1151932 | 5/1969 | United Kingdom |
| 1211539 | 11/1970 | United Kingdom |
| 1373503 | 11/1974 | United Kingdom |
| 1520986 | 8/1978 | United Kingdom |

*Primary Examiner*—David M. Mitchell
*Attorney, Agent, or Firm*—Webb, Burden, Ziesenheim & Webb

[57] ABSTRACT

A control system for enabling a conveyor cart or carts to run automatically along a running track. The or each cart comprises a sensor for detecting a guiding line extending along the running track and outputting detection data, and a steering control device operable in response to the detection data for steering the conveyor cart to follow the guiding line. The sensor is switchable for selectively detecting right and left edges of the guiding line. The right edge is detected for permitting the cart to run through a junction along a rightwardly curved branching or merging line. The left edge is detected for permitting the cart to run through a junction along a leftwardly curved branching or merging line.

10 Claims, 15 Drawing Sheets

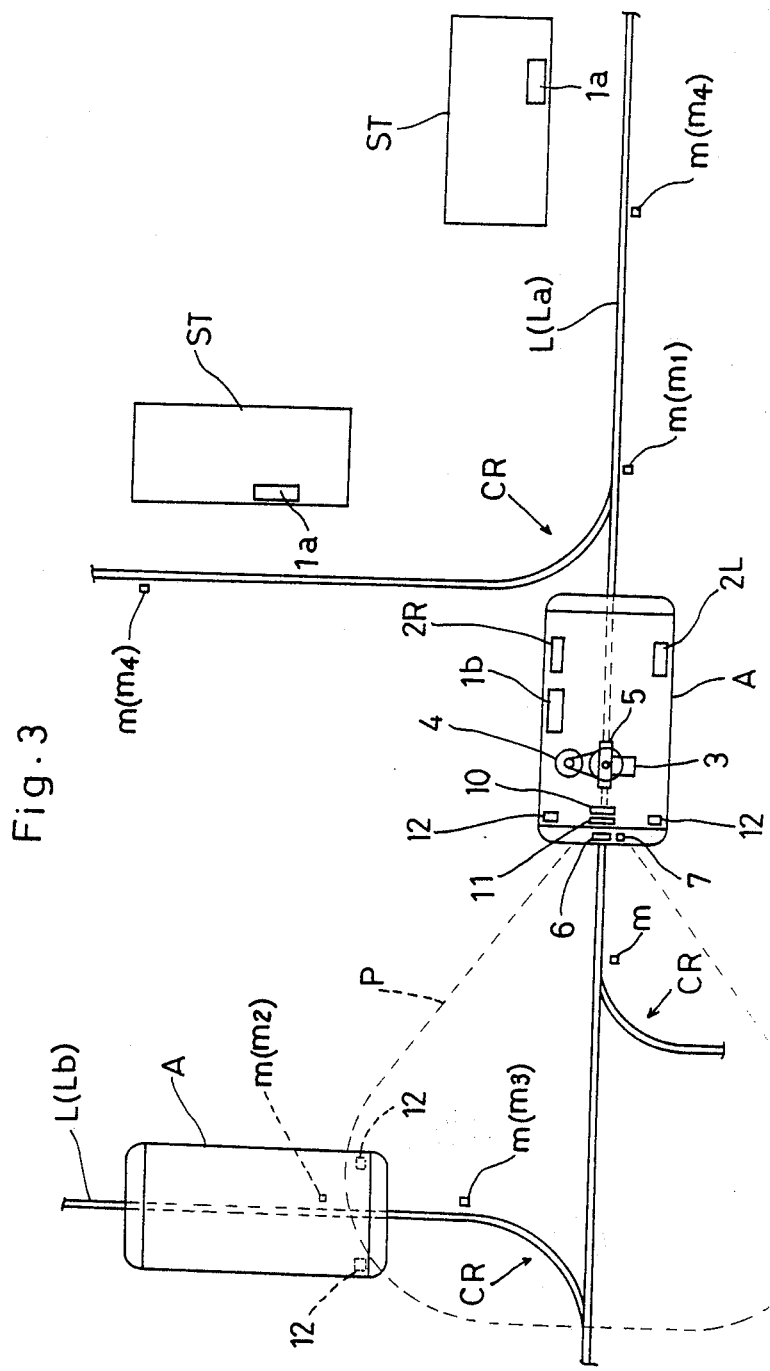

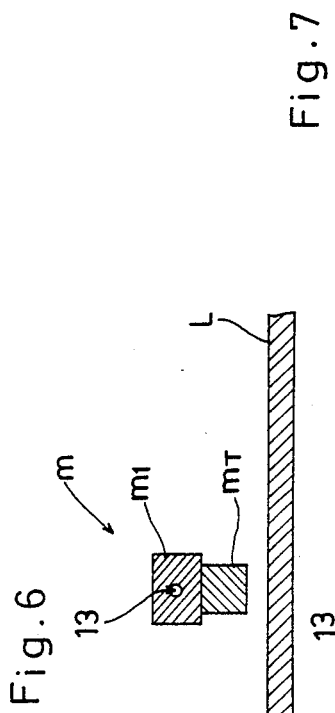
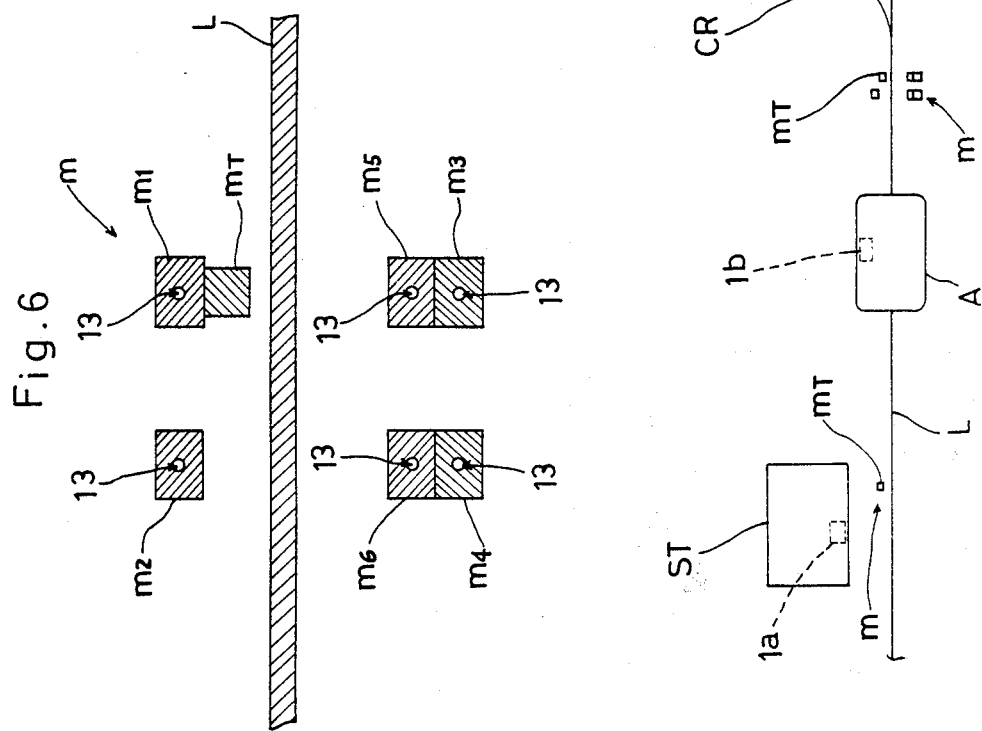

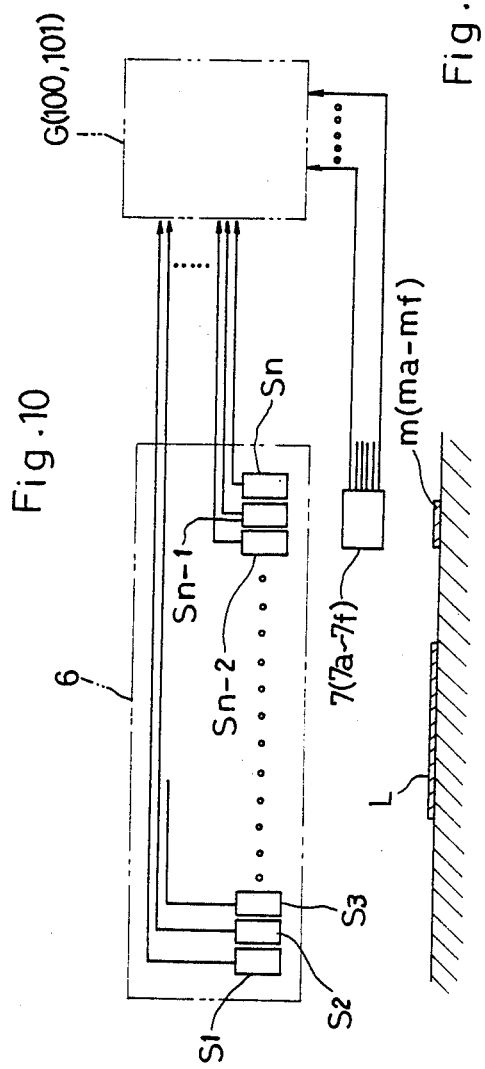
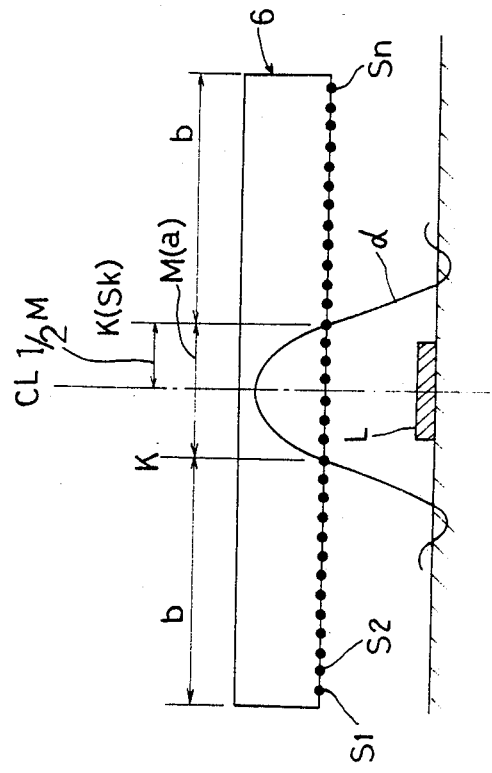
Fig. 10
Fig. 11

Fig. 17
(a)
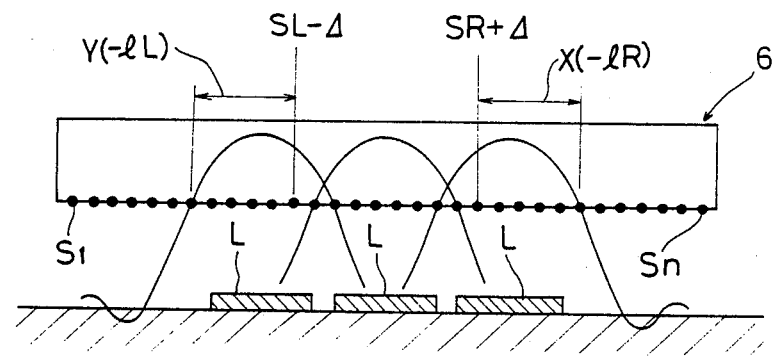
(b)
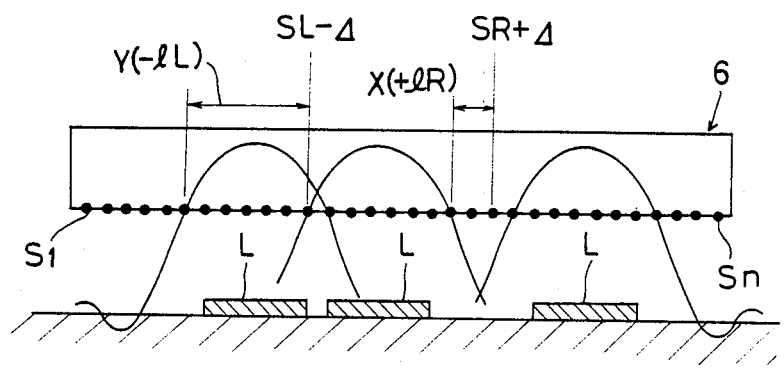
(c)
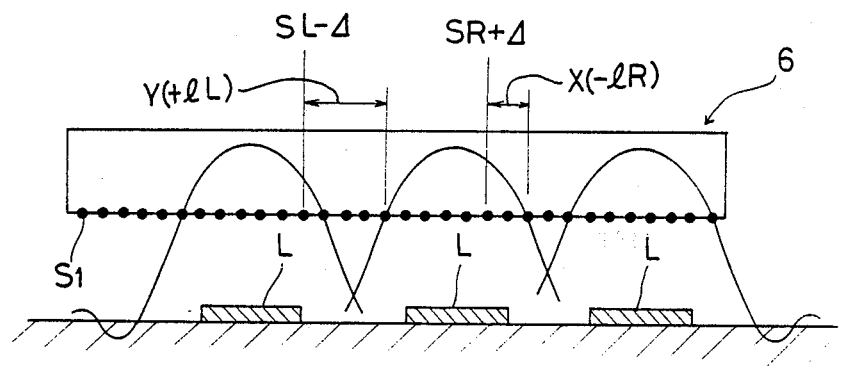

RUNNING CONTROL SYSTEM FOR CONVEYOR CART

BACKGROUND OF THE INVENTION (1) Field of the Invention

The present invention relates to a control system including means to steer conveyor carts for carrying various articles in a factory or warehouse.

More particularly, the invention relates to a control system comprising conveyor carts and magnetic guiding lines extending along running tracks. Each conveyor cart includes detecting means for detecting the guiding lines and outputting detection data for use in steering control, and steering control means operable in response to the detection data for causing the cart to run automatically along the guiding lines.

(2) Description of the Prior Art

With this type of running control system, it has been conventional practice to derive, from detection data provided by magnetism sensing means, a displacement of the conveyor cart with respect to the centerline of the guiding line and to steer the cart to decrease the displacement with respect to the centerline to zero (see Japanese utility model publication No. 51-47196 for example).

This type of running control system includes the cases of causing the conveyor cart to run along a running track branching from another and to run along a running track merging with another. In the prior art, however, the cart is caused to run along the guiding line following its centerline, and therefore the cart is unable to run along a branching or merging line as desired where guiding lines are installed along two running tracks. More particularly, the magnetism detecting means detects the two guiding lines at a branching or merging point at the same time. As a result, the centerline of a target guiding line branching from or merging with another line cannot be detected accurately, and the cart tends to run into trouble such as a deviation from the selected running track.

The conveyor cart may be allowed to run by self-control at the branching or merging section on the basis of pre-stored steering data without using the detection data provided by the magnetism detecting means. However, this control mode has disadvantages from a practical point of view in that the construction for effecting the steering control is complicated and that the conveyor cart could slip off a selected running track.

There is another known running control system which includes magnetic guiding lines along running tracks and magnetism detecting means (sensor) having a plurality of magnetism sensitive elements arrange transversely of a conveyor cart. According to this system, transverse displacements of the cart relative to the guiding line are detected in a plurality of steps on the basis of data as to which magnetism sensitive elements are detecting the magnetism of the guiding line. The plurality of magnetism sensitive elements provide detection signals which are input to a control unit in parallel. Thus, the control unit scans the magnetism sensitive elements sequentially from an element at one end, and judges order numbers of the operating elements counted from the center of the sensor. Then the voltage is changed to correspond to the positions of the operating elements, thereby deriving a signal corresponding to the transverse displacement of the cart relative to the guiding line (See the Japanese patent application laid open under No. 59-154511).

The above known construction requires the operation for causing the plurality of magnetism sensitive elements to output their respective detection signals in parallel, scanning the elements sequentially to determine the positions of operating elements, and changing the voltage signal to correspond to the displacement in response to the positions of operating elements. This construction requires a great number of connecting wires between the control unit and sensor, and its displacement detecting operation is complicated.

The construction in which the plurality of magnetism sensitive elements are scanned sequentially from one end to find operating elements, requires a great number of wires between the sensor and control unit if the number of magnetism sensitive elements is increased in order to improve resolution of the detection signals. This necessitates a troublesome wiring operation and increases the chances of miswiring. Furthermore, one scan of all the magnetism sensitive elements takes a long time, which means that a long time is required for detecting the displacement of the conveyor cart relative to the guiding line. Therefore, the above construction has the disadvantage of slow response for steering the cart.

SUMMARY OF THE INVENTION

The present invention has been made having regard to the state of the art and in order to eliminate the disadvantages of the known constructions noted above. The object of the invention, therefore, is to provide a simple running control system for causing the conveyor cart to automatically run along guiding lines with accuracy, including a section where the running track branches off or merges with another track.

In order to achieve this object, the running control system according to the present invention is characterized in that the detecting means for detecting the guiding line to steer the cart is switchable to selectively detect left and right edges of the guiding line. This characterizing feature has the following function and effect.

The control system according to the invention permits the conveyor cart to run automatically along the guiding line as in the prior art, by causing the cart to detect an edge of the guiding line. The detecting means of the cart is switchable between a position to detect the left edge of the guiding line and a position to detect the right edge thereof. When causing the cart to run from one guiding line to another, branching or merging line, the detecting means is switched to detect the right or left edge of the guiding lines according to a branching or merging direction. Therefore the cart is readily guided in a selected direction along the guiding lines.

Thus, the invention permits the cart to run along the guiding lines with accuracy, including a merging or branching section. The cart is now capable of running through the merging or branching section in an excellent manner without any trouble.

Other advantages of the present invention will be apparent from the detailed description of embodiments to follow.

BRIEF DESCRIPTION OF THE DRAWINGS

The drawings illustrate a conveyor cart control system embodying the present invention, in which:

FIG. 3 is a schematic plan view showing a conveyor cart construction and a running track layout, FIG. 6 is an enlarged plan view of a modified control mark, FIG. 7 is a schematic plan view of a running track layout including modified control marks as shown in FIG. 6, FIG. 10 is a partial block diagram of a modified control system and sensor construction, FIG. 11 is an explanatory view of an operative area of the sensor shown in FIG. 10.

DETAILED DESCRIPTION OF THE PREFERRED EMBODIMENTS

Figure 1:
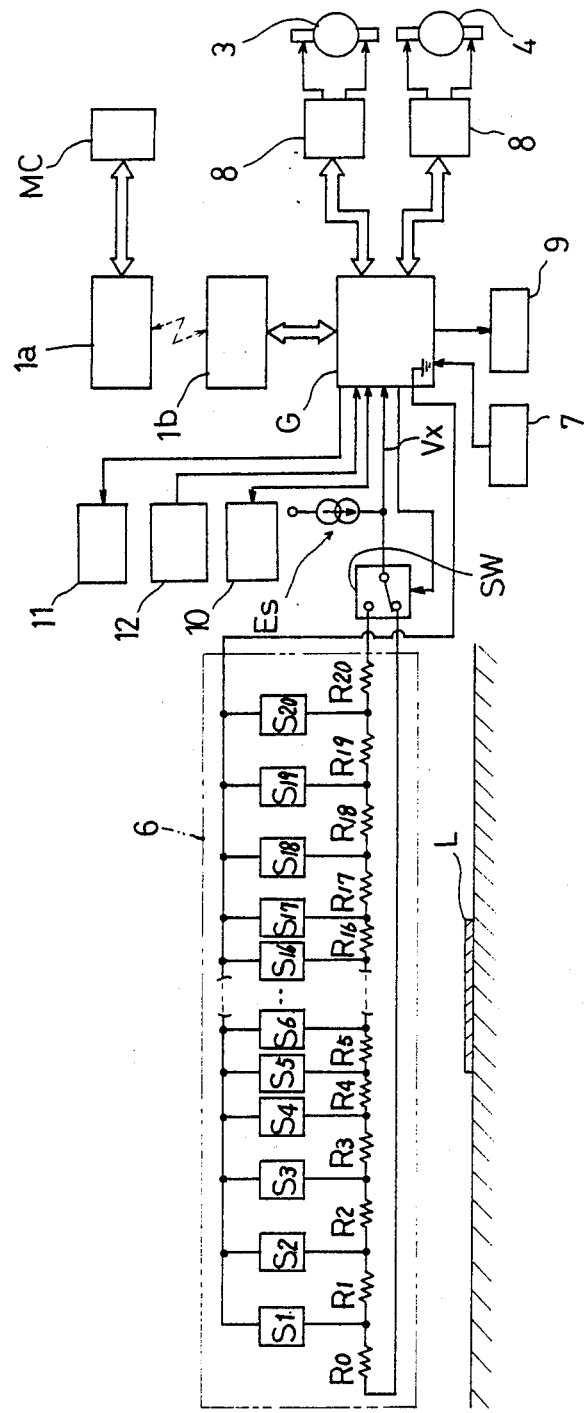
FIG. 1 is a block diagram of the control system including a sensor construction.

Referring to FIGS. 1 and 3, the conveyor system shown therein comprises running tracks of a conveyor cart A including junctions CR. Magnetic guiding lines L are placed along the running tracks by adhering the lines L to running track surfaces, with upper faces thereof constituting N-poles and lower faces S-poles. Running control data such as a beginning point and an ending point of branching and merging at each junction, stopping points, etc. are provided by combinations of magnetic pole positions of permanent magnets. Marks m for providing instructions for the conveyor cart A are arranged on the running track surfaces alongside the guiding lines L.

Each guiding line L comprises a thin belt of a synthetic resin mixed with magnetic substance and magnetized to have the upper face constituting N-pole and the lower face constituting S-pole. An adhesive is applies to the lower face of the guiding line also.

As shown in FIG. 3, the conveyor system further comprises stations St laterally of the running tracks for loading and unloading the conveyor cart A. Each station St includes a ground communication unit 1a for transmitting control data from a central control unit MC to conveyor cart A concerning branching or merging directions at the junctions CR, a next station for stopping, etc.

As shown in FIGS. 1 and 3, the conveyor cart A comprises a pair of right and left propelling wheels 2R, 2L driven and stopped by a propelling motor 3, and a dirigible wheel 5 disposed at a forward portion of the cart to be turned right and left by a steering motor 4. The cart A carries an guiding line sensor 6 attached, with a detecting surface thereof directed downwardly, to a transversely mid-position of the cart front. The sensor 6 acts as detection means to detect transverse displacements of the cart with respect to the guiding lines L for steering control of the cart. A mark sensor 7 is disposed at a lefthand side of the guiding line sensor 6 for detecting the marks m. The mark sensor 7 comprises a plurality of magnetism sensing type proximity sensors.

The conveyor cart A further includes a communication unit 1b at a lateral side thereof opposed to the stations ST for communicating with the ground communication units 1a. A control unit G is provided to discriminate detection data received from the sensors 6, 7 and the data received through the communication unit 1b for controlling running of the cart A. This control unit G also acts as steering control means. Number 8 in FIG. 1 indicates drive devices for operating the propelling motor 3 and the steering motor 4.

The conveyor cart A is driven under control according to the detection data provided by the sensors 6, 7 and the instruction data transmitted through the communication units 1a, 1b. Thus, the conveyor cart A is automatically controlled to travel along the running tracks as instructed, branching off or merging at the junctions CR. In this way the conveyor cart A carries various kinds of articles from one station ST to another.

The guiding line sensor 6 is attached to an undersurface of the cart front such that a mid-point transversely of the sensor 6 and the conveyor cart A coincides with a centerline or mid-point transversely of the guiding line L. The sensor 6 includes a plurality of magnetism sensitive switches S1–S20 arranged parallel to one another and acting as magnetism sensitive elements, and a plurality of resistances R0–R20 connected in series. Each of the switches S1–S20 has a magnetism sensitive surface opposed to the running track surfaces, and is closed when a detected magnetism exceeds a predetermined value. One of the terminals of each switch is grounded together with terminals of the other switches, and the other terminal is connected to a point between an adjacent pair of the resistances R0–R20. When certain of the switches S1–S20 are turned on by the magnetism of guiding line L, the points between the corresponding pairs of resistances R0–R20 are short-circuited to the ground potential. Then resistance values of two resistances R0, R20 at opposite ends of the resistances R0–R20 and the ground potential vary according to the positions of the switches turned on.

A constant DC source Es is connected through a changeover switch SW to the two resistances R0 and R20 at the opposite ends. The switch SW acts as means for selecting which of the opposite end resistance values with respect to the common potential is to be detected. An output voltage Vx occurring at a connection between a common terminal of the changeover switch SW and the constant DC current source Es is input to the control unit G as detected transverse deviation of conveyor cart A with respect to the guiding line L.

Figure 2:
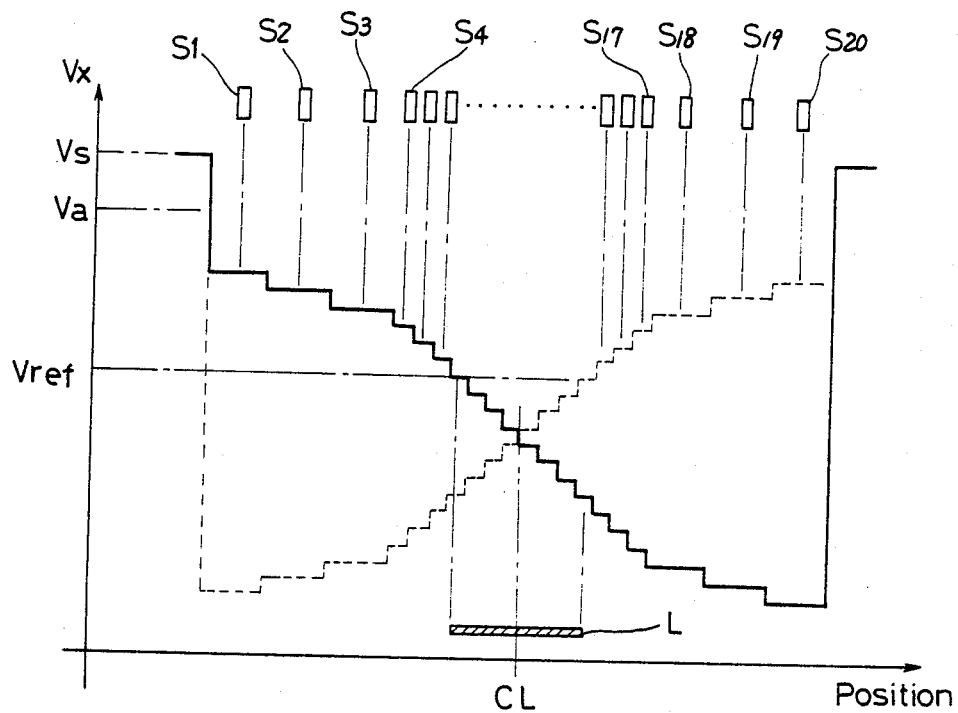
FIG. 2 is a graph showing sensor output characteristics.

Three switches S1-S3 (S18-S20) at each end of the switches S1-S20 are arranged at greater intervals than the other switches S4-S17. The two end resistances R0 and R20 have a greater resistance value than the other resistances R1-R19. As shown in FIG. 2, the more the conveyor cart A deviates from the center of the guiding line L, the grosser become variations in the resistance values between the two end resistances R0, R20 and the ground potential, namely variations in the output voltage Vx. Thus, the more the conveyor cart A deviates with respect to the guiding line L, the less precise the steering control becomes automatically without changing control characteristics of the control unit G.

If the conveyor cart A transversely deviates to a great extent from the guiding line L, all of the switches S1-S20 are turned off. At this time, as shown in FIG. 2, the output voltage Vx of guiding line sensor 6 increases to voltage Vs which is greater than normal voltage. When the output voltage Vx exceeds a predetermined voltage Va, an alarm is operated whereby an abnormal situation is readily noticed.

The operation of the control unit G will be described next. When the mark sensor 7 detects a stopping mark m at one of the stations ST, the control unit G stops the propelling motor 3 to stop the conveyor cart A for loading or unloading the cart A. During this time the cart A receives, through the communication units 1a and 1b, various running control data such as sensor switching data as to the number of branching and/or merging marks m and which, right or left, side edge the cart A should follow while detecting such marks until the cart A reaches a next station ST.

Accordingly, each time the marks sensor 7 detects the marks m, the control unit G carries out the steering control such as by causing, in accordance with the data received through the communication units 1a and 1b, the changeover switch SW to switch the directions in which the current from the constant current source Es flows through the guiding line sensor 6, and by changing the steering directions. As a result, the conveyor cart A automatically runs, following the righthand edge or lefthand edge of the guiding lines L, and in a selected direction along a branching or merging line at each junction.

How the cart A is controlled to run along the guiding lines L in places other than the junctions CR will be described first. As shown in FIG. 1, the changeover switch SW is placed in a position to connect the constant DC current source Es to the resistance R20 at the righthand end of the series of resistances R0-R20, for outputting a voltage Vx corresponding to a displacement with respect to the righthand edge of the guiding line L. The output voltage Vx is compared with a reference voltage Vref corresponding to zero displacement of the cart A with respect to the righthand edge of the guiding line L, and the steering motor 4 is rotated backward and forward and is stopped to eliminate a difference between the output voltage Vx and the reference voltage Vref.

A steering control for causing the cart to branch off leftward at a junction CR will be described next. As shown in FIG. 3, the mark sensor 7 detects a mark m as the conveyor cart A approaches a junction CR. Then the changeover switch SW is placed in a position to connect the constant DC current source Es to the resistance R0 at the lefthand end of the series of resistances R0-R20, for outputting a voltage Vx corresponding to a displacement with respect to the lefthand edge of the guiding line L. The output voltage Vx is compared with a reference voltage Vref corresponding to zero displacement of the cart A with respect to the lefthand edge of the guiding line L, and the steering motor 4 is rotated backward and forward and is stopped to eliminate a difference between the output voltage Vx and the reference voltage Vref. In this case, the action of the changeover switch SW for switching the direction of current flow results in a right and left reversal of variations in the output voltage Vx as shown by a broken line in FIG. 2. Therefore, the steering control is effected by reversing right and left steering direction with respect to results of comparison between the voltage Vx and reference voltage Vref.

The steering control based on the detection of a displacement with respect the lefthand edge of the guiding line L may be carried out by employing the same voltage as the reference voltage Vref used in connection with the righthand edge of the guiding line L. The reason is as follows. The resistances R0-R20 and magnetism sensitive switches S1-S20 of the guiding line sensor 6 are in a transversely symmetric arrangement. Therefore, when the conveyor cart A is in a proper position over the centerline CL or transversely midpoint of the guiding line, the switching by the changeover switch SW of the direction in which the resistance value is detected results in the same detected resistance value, namely the same detection voltage Vx of the sensor 6. The right and left edges of the guiding line are at an equal distance to the centerline CL, and it is not necessary to change the reference for the detection voltage Vx of the sensor 6 whichever edge of the guiding line L may be used for judging displacement.

According to this construction, the switching by the changeover switch SW of the direction in which the resistance value is detected results in the same detected resistance value as described above. This construction permits the conveyor cart to run without right or left displacement relative to the guiding line even when the cart runs along a branching or merging line at a junction and a switching is made for causing the cart to follow the righthand edge or lefthand edge of the guiding line. Thus, the controls for branching and merging at the junctions are effected in an excellent manner with the sensor for steering control and the steering control means having simplified constructions.

Although the description so far made concerns the case of one conveyor cart running along the guiding lines, the invention may be practiced, without any problem, in a mode wherein a plurality of conveyor carts arranged on the same running track including complex branching and merging lines. In the latter case, the order of priority may be provided for the guiding lines to avoid a simultaneous entry of two carts into a merging point which could result in a collision therebetween.

More particularly, when two conveyor carts arrive at regions short of a merging point where a plurality of guiding lines merge, the cart on a priority guiding line transmits a priority signal to the other cart which is on a non-priority guiding line. The priority signal causes the cart on the non-priority guiding line to make an emergency stop thereby avoiding a collision between the two carts.

Further, deceleration control means may be provided to decelerate the conveyor cart arriving at the region of the non-priority guiding line short of the point where the non-priority line merges with the priority line. In this case, the cart on the non-priority line is allowed to advance to the merging point at a slow speed. This shortens the running distance required for the cart to make the emergency stop on the non-priority line. Therefore, the cart on the non-priority line may be allowed to a position just short of the merging point and stopped in this position without fail in order to avoid its collision with the other cart.

The marks m arranged laterally of the guiding lines L as shown in FIG. 3 comprises various marks m1–m4. Mark m1 is a branching mark indicating a branch-off starting point. Mark m2 is a merging mark indicating a merger starting point and acts also as deceleration starting mark indicating a deceleration starting point for decelerating the conveyor cart A approaching the merging point of junction CR. Mark m3 is a deceleration finishing mark indicating a position for finishing the deceleration effected upon detection of the merging mark m2. Mark m4 is a stopping mark indicating a stopping position at each station ST. These marks m are detected by the magnetism sensitive proximity sensor 7 attached to each conveyor cart A at a lefthand side of the guiding line sensor 6.

One of the illustrated guiding lines is a priority line La for giving priority to a conveyor cart thereon for running past the junction CR. The other guiding line which merges with the priority line La is a non-priority line for stopping a cart thereon for standby when there is a cart running on the priority line and passing through or approaching the junction CR. Thus, for passing through the junction CR the cart A on the guiding line La is given priority over the cart A on the guiding line Lb. This assures an automatic avoidance of a collision between the two carts at the junction CR.

Each conveyor cart A includes a noncontact type sensor such as an ultrasonic sensor 10 for detecting presence or absence of an obstacle ahead. When this sensor 10 detects an obstacle, the cart A is controlled to make an emergency stop to avoid collision with an obstacle. Each conveyor cart A further includes a light emitter 11 and light receivers 12 for determining the described priority relationship. The light emitter 11 emits infrared rays from the cart A on the priority line La toward the cart on the non-priority line Lb as priority signal P indicating that the cart A on the priority line La is approaching the junction CR. The light receivers 12 act as means for receiving the priority signal P emitted by the light emitter 11.

Next, stopping control means and deceleration control means will be described with reference to the operation of the control unit G. The stopping control means causes the conveyor cart A on the non-priority guiding line Lb to make the emergency stop at a position short of the junction CR upon receipt of the priority signal P from the conveyor cart A on the priority guiding line La. The deceleration control means decelerates the conveyor cart A on the non-priority guiding line Lb upon detection by the mark sensor 7 of the deceleration starting and merging mark m2.

Figure 4:
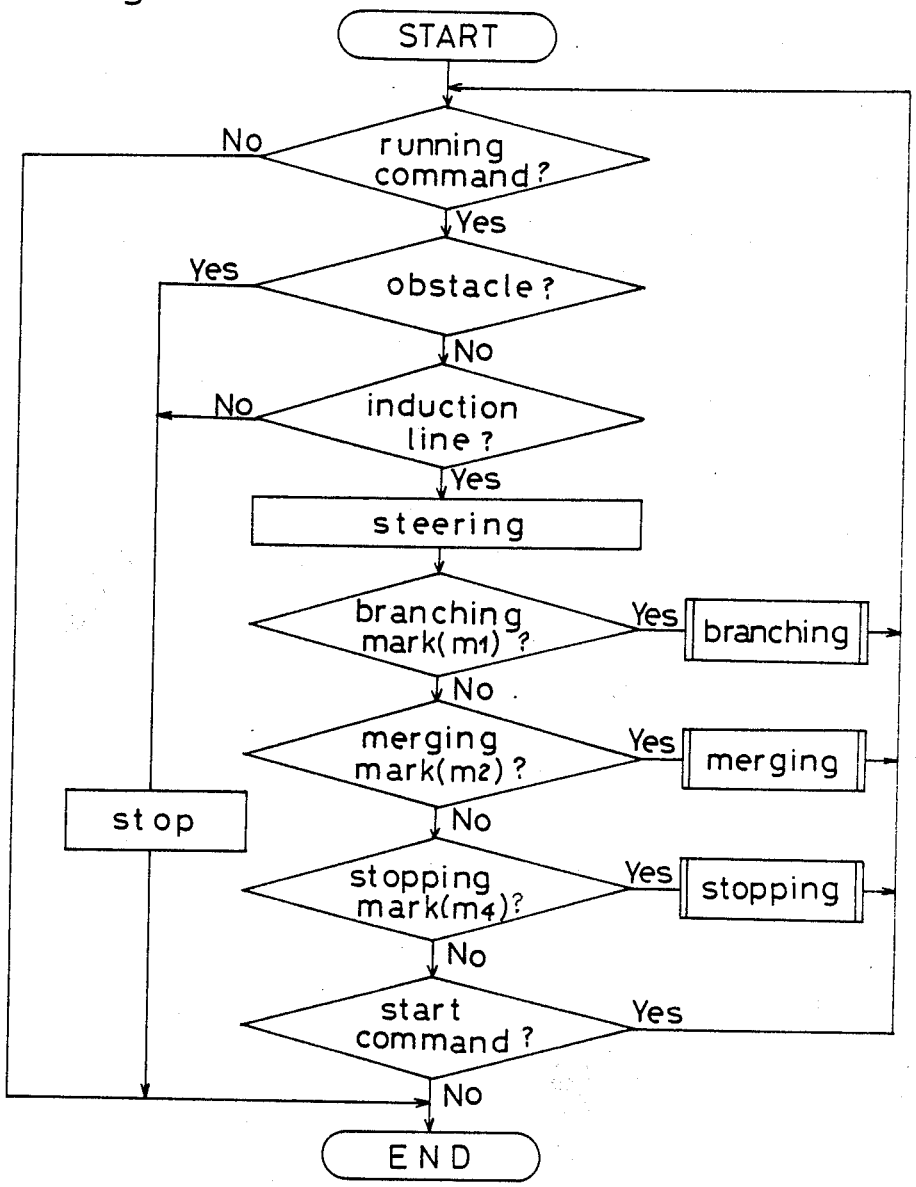
FIG. 4 is a flowchart of an overall control operation.

Referring to FIG. 4, when the conveyor cart A starts running, presence or absence of an obstacle ahead is judged from detection data provided by the ultrasonic sensor 10. If there is an obstacle, the conveyor cart A is stopped immediately. If there is no obstacle, a steering control is effected by controlling the steering motor 4 according to the detection data provided by the guiding line sensor 6, to enable the conveyor cart A to automatically run along the guiding line L. The conveyor cart A is stopped immediately if the guiding line sensor 6 fails to detect the guiding line L. Thereafter, each of the marks m detected by the mark sensor 7 is judged as to its kind for carrying out a corresponding operation. When the detected mark m is a branching mark m1, a branching operation is carried out for causing the conveyor cart A to take the branching line. This operation includes switching of the edge of the guiding line L to be detected by the guiding line sensor 6 to the right or left edge in accordance with a branching direction. When a merging mark m2 is detected, a merging operation described later is carried out. When a stopping mark m4 indicating arrival at a station ST, a stopping operation is carried out for stopping the propelling motor 3 to stop the conveyor cart A. Then the conveyor cart A is loaded and/or unloaded with articles at the station ST. During this loading/unloading operation, the conveyor cart A receives various running control data through the communication units 1a and 1b. These data includes the numbers of branching marks m1 and merging marks m2 at the junctions CR between this station ST and the next station ST, and sensor switching data for selecting, upon detection of these marks, the right or left edge of the guiding line L along which the conveyor cart A is to run. Then the conveyor cart A waits for a start command for resuming the run.

Accordingly, each time the mark sensor 7 detects the marks m, the control unit G switches the guiding line sensor 6 and the steering direction in accordance with the data received through the communication units 1a and 1b. As a result, the conveyor cart A automatically runs, following the righthand edge or lefthand edge of the guiding lines L, and in a selected direction along the branching or merging line at each junction CR.

Figure 5:
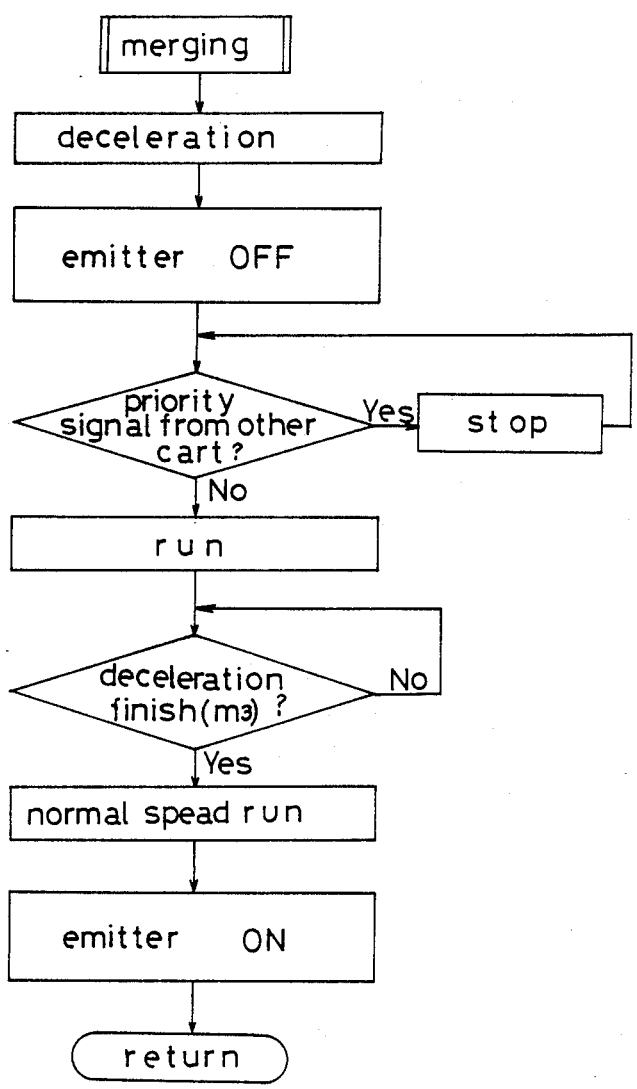
FIG. 5 is a flowchart of a merging operation.

The merging operation will now be described with reference to FIG. 5. When the conveyor cart A running on the non-priority guiding line Lb approaches the junction CR and detects the merging mark m2, the propelling motor 3 is immediately decelerated to a speed enabling the conveyor cart A to make an emergency stop. At the same time the light emitter 11 is turned off to stop emission of the priority signal P. Until the deceleration finishing mark m3 is detected, the decelerated state is maintained with only the light receivers 12 kept operative to monitor if there is a conveyor cart A runing on the priority guiding line La and approaching or passing through the junction CR. Thus, the deceleration control means is operable to decelerate the conveyor cart A on the non-priority line Lb at the position short of the merging point. If the light receivers 12 of the conveyor cart A on the non-priority line Lb receive the priority signal P emitted from the conveyor cart A on the priority line La, the stopping control means stops the conveyor cart A on the non-priority line Lb until the light receivers 12 cease receiving the priority signal P, thereby automatically avoiding a collision at the junction CR. The conveyor cart A on the non-priority line Lb is allowed to run at the decelerated speed if the light receivers 12 do not receive the priority signal P or after the light receivers 12 cease receiving the priority signal P with passing through the junction CR of the conveyor cart A on the priority line La. When the deceleration finishing mark m3 is detected subsequently, the emission of the priority signal P from the light emitter 11 is resumed and the conveyor cart A is returned to a normal speed for running onto the priority line La.

The conveyor cart A makes an emergency stop if the ultrasonic sensor 10 comes into operation during this merging process.

The conveyor cart A on the priority line La, on the other hand, is allowed to run past the junction CR without being decelerated or stopped, with its light emitter 11 continuing to emit the priority signal P. However, if the conveyor cart A on the non-priority line Lb has already entered the junction CR, the ultrasonic sensor 10 comes into operation whereupon the conveyor cart A on the priority line La makes an emergency stop and waits for the conveyor cart A on the non-priority line Lb to run past the junction CR. Therefore, the two carts never collide with each other whichever cart may arrive at the junction CR first.

Thus, the control action for simply decelerating the conveyor cart A on the non-priority line lb at a position short of the junction CR or merging point of the priority line La and non-priority line Lb, is effective to shorten the distance necessary for the conveyor cart A to stop immediately upon receipt of the priority signal P emitted from the conveyor cart A on the priority line La. This enables the carts to run past the merging point in the order of priority without colliding with each other even through the cart on the non-priority line Lb is allowed to approach the merging point, namely the priority signal P emitted from the cart on the priority line La has a reduced range of emission.

In the described embodiment, the infrared ray emitter 11 and receivers 12 constitute means for emitting the priority signal P and means for receiving the same, respectively. These light emitting and receiving means may have varied specific constructions. For example, means for emitting and receiving ultrasonic wave or electromagnetic wave may be employed.

Each of the marks m may comprise a construction as shown in FIGS. 6 and 7. This mark m includes six magnetic pieces m1-m6 each formed of a thin sheet of synthetic resin mixed with a magnetic material as is the guiding line L. The mark m provides a data indication based on the arrangement of the magnetic pieces m1-m6 and combination of their magnetic poles (S-pole or N-pole) formed on upper faces thereof. The mark m also includes a trigger magnetic piece mT having a smaller area than each of the magnetic pieces m1-m6 and indicating a mark reading position.

Two pieces m1 and m2 of the magnetic pieces m1-m6 are disposed on the lefthand side of the guiding line L, one forwardly of the other, with respect to the running direction of conveyor cart A. The remaining four magnetic pieces m3-m6 are disposed on the righthand side of the guiding line L. The pieces m3 and m5 are opposed to the forward one m1 of the magnetic pieces on the lefthand side of the guiding line L. The pieces m4 and m6 are opposed to the rearward one m2 of the magnetic pieces on the lefthand side of the guiding line L.

The trigger magnetic piece mT is disposed adjacent an inside face of the forward magnetic piece m1 disposed on the lefthand side of the guiding line L. The trigger magnetic piece mT defines S-pole on its upper surface as distinct from N-pole defined on the upper surface of the guiding line L. This permits the mark sensor 7, which will described later, to differentiate the trigger magnetic piece mT and guiding line L for reading the mark m including the plurality of magnetic pieces m1-m6 and to make no error as to reading positions of the magnetic pieces arranged along the direction of cart movement.

The magnetic pieces m1-m6 constituting the mark m are divided into two types, one defining N-pole on the upper surface and the other defining S-pole on the upper surface. The N-pole and S-pole surfaces are combined in different ways to indicated different control data. Each of the magnetic pieces m1-m6 defining N-pole on its upper surface includes a center hole 13 for allowing visual magnetic pole identification.

Figure 8:
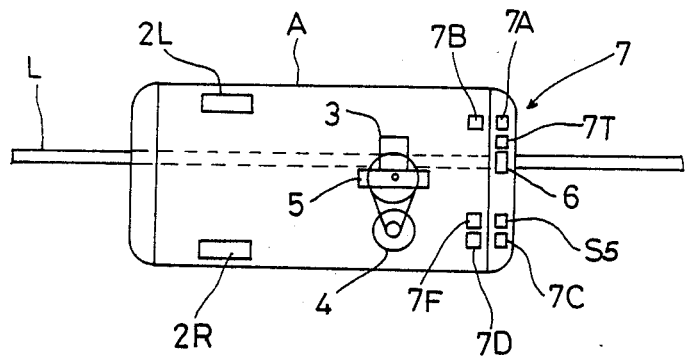
FIG. 8 is a plan view of a conveyor cart suited for the running tracks of FIG. 7.
Figure 9:
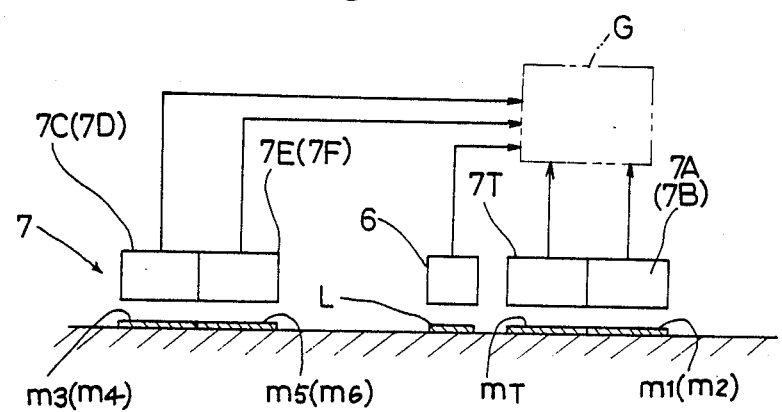
FIG. 9 is a partial block diagram of a control system for the conveyor cart of FIG. 8.

Referring to FIGS. 8 and 9, the mark sensor 7 provided on the conveyor cart A includes a plurality of magnetism sensitive proximity sensors 7T and 7A-7F distributed to right and left lateral sides of the guiding line sensor 6 acting as detecting means of the steering control mechanism. These proximity sensors comprise a sensor 7T for detecting the trigger magnetic piece mT, and other sensors 7A-7F, which are arranged so as to correspond the arrangement of trigger magnetic piece mT and magnetic pieces m1-m6. When the sensor 7T detects the trigger magnetic piece mT, the sensors 7A-7F act simultaneously to detect the magnetic pieces m1-m6 and judge their magnetic pole arrangement. The sensor 7T for detecting the trigger magnetic piece mT is operable only in response to S-pole magnetism, and does not respond to N-pole magnetism provided by the guiding line L. On the other hand, the guiding line sensor 6 detects only N-pole magnetism in order not to malfunction with the trigger magnetic piece mT.

The conveyor cart A may intersect the guiding line L when passing through the junction CR where the guiding line L branches off into two lines or two lines merges into one. Then the proximity sensor 7T for detecting the trigger magnetic piece mT passes over the guiding line L before or after the junction CR. However, the proximity sensor 7T never mistakes the guiding line L for the trigger magnetic piece mT since the proximity sensor 7T is responsive only to S-pole which is different from the magnetic pole of the guiding line L. Similarly, the guiding line sensor 6 is responsive to N-pole and therefore will not malfunction by detecting the trigger magnetic piece mT.

The conveyor cart A is driven under control according to the detection data provided by the sensors 6, 7 and the instruction data transmitted through the communication units 1a, 1b. Thus, the conveyor cart A is automatically controlled to travel along the running tracks as instructed, branching off or merging at the junctions CR. In this way the conveyor cart A carries various kinds of articles from one station ST to another.

As described above, each control mark m includes a plurality of magnetic pieces and a trigger magnetic piece for indicating the reading position of the mark. The trigger magnetic piece has a magnetic pole different from that of the guiding line. Such a simple modification is capable of accurately providing the conveyor cart with control data. There occurs no error in reading the data, and this permits the conveyor cart to run as desired.

In the foregoing embodiment, the marks m for providing the running control data comprise thin synthetic resin sheets arranged alongside the running track. However, their specific construction is variable in many ways, and may comprise permanent magnet pieces embedded in the running track surfaces, for example. The proximity sensors for detecting the magnetic pieces may comprise a pair of reed switch responsive to S-pole and reed switch responsive to N-pole. Similarly, the number of magnetic pieces is variable according to a maximum indication number.

FIG. 10 shows a modified guiding line or steering control sensor 6. This sensor 6 includes a plurality of magnetism sensitive elements S1-Sn arranged transversely of the conveyor cart for outputting a detection signal upon detection of N-pole magnetism exceeding a predetermined intensity.

As shown in FIGS. 10 and 11, when the conveyor cart A is in a proper position relative to the guiding line CL, the centerline L of the steering control sensor 6 is located over the mid-position transversely of the guiding line L. A sensor actuating area α is defined by a magnetic field intensity distribution corresponding to the magnetic intensity for turning on the sensing elements S1-Sn. That is, those of the sensing elements S1-Sn inside the area α are operative and those outside are not operative.

Therefore, the sensing elements operative by being inside the sensor actuating area α define a sensitive range a of the steering sensor 6, and the sensing elements outside the sensor actuating area α define insensitive ranges b thereof. The positions of the operative sensing elements adjacent the inoperative sensing elements correspond to boundaries K between the sensitive range a and the insensitive ranges b. There are two boundaries K formed at opposite right and left sides since the sensor actuating area α has a width M transversely of the conveyor cart.

A reference position SK is initially set to a position displaced rightward by half (M/2) the width M of the sensitive range a, with the conveyor cart A in the proper position relative to the guiding line L, namely with the centerline CL of the steering control sensor 6 coinciding with the mid-position transversely of the guiding line L. The conveyor cart is steered by controlling the steering motor 4 to cause a distance 1 between the boundary K and the reference position SK to approach zero. However, as described in detail later, when the cart runs a section of the track curving leftward or branching leftward at a junction CR, the lefthand boundary K is utilized by setting the reference position SK to a position displaced leftward by half the width M of the sensitivity range a with respect to the centerline CL of the steering control sensor 6.

Thus, the reference position SK is set to a position displaced either rightward or leftward b half the width M of the sensitivity range a with respect to the centerline CL of the steering control sensor 6. This setting operation is carried out by reference position setting means 101.

According to this embodiment, the reference position SK is set rightward when causing the conveyor cart A to run straight along the guiding line L or to branch rightward at the junction CR. On the other hand, the reference position S is set leftward when causing the conveyor cart A to branch leftward at the junction CR. Therefore, even when the steering control sensor 6 detects a plurality of guiding lines L at a time the cart passes through the junction CR, the cart is capable of automatic running without selecting a wrong track.

Figure 12:
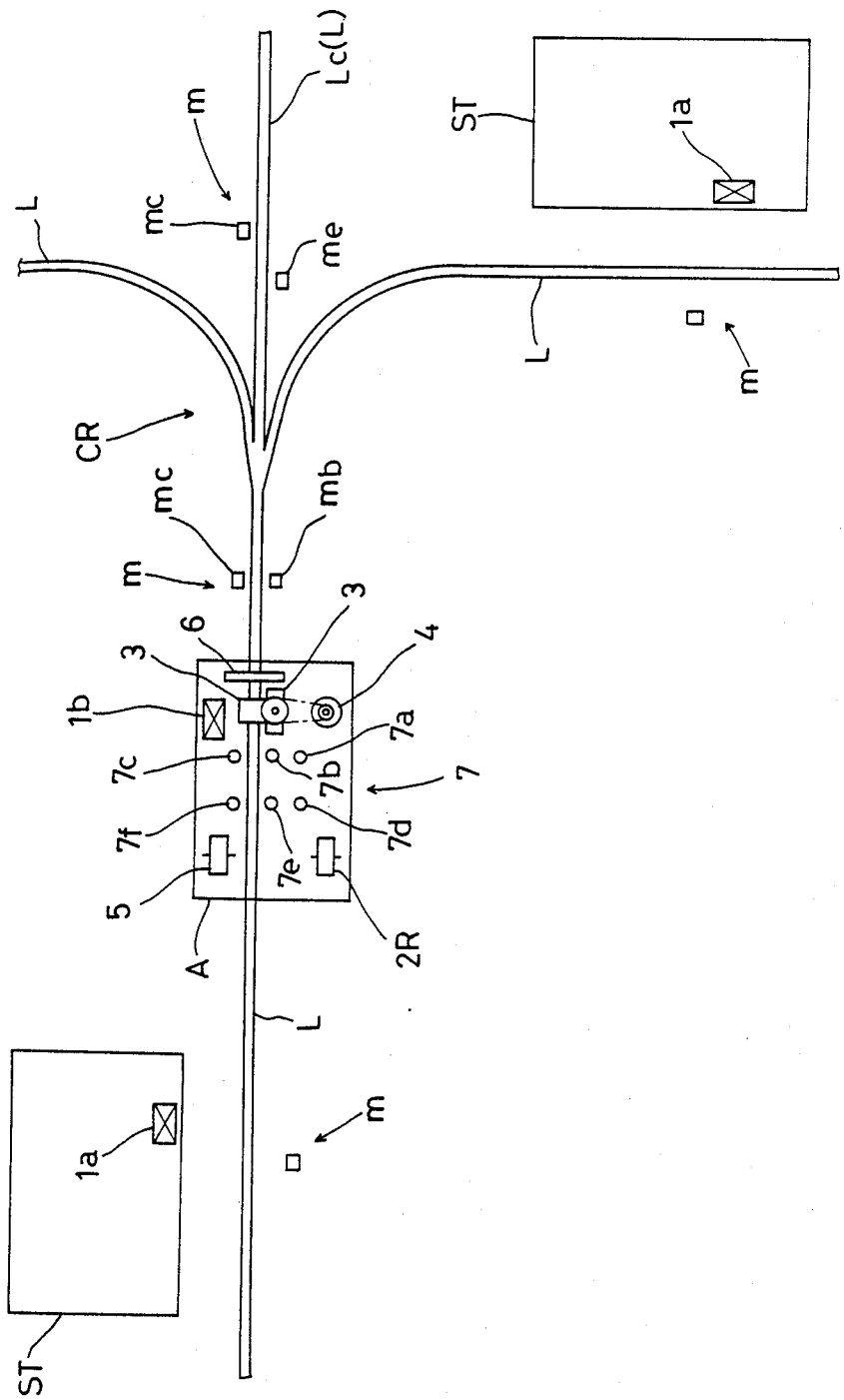
FIG. 12 is a schematic plan view showing a conveyor cart equipped with the sensor shown in FIG. 10 and a running track layout.

However, as described in detail later, when the conveyor cart is controlled to run through a junction where the guiding line L branches into three lines, of which the cart is to take the middle line Lc, as shown in FIG. 12, reference positions are set both rightward and leftward to permit the cart to follow only the middle line Lc on the basis of positional relationship between the reference positions and the boundaries K.

Various marks ma-mf are arranged alongside the guiding line L for providing the conveyor cart A with running control data. The conveyor cart A includes a proximity sensor 7 for detecting these marks ma-mf. This proximity sensor 7 comprises proximity sensor elements 7a-7f corresponding to the various marks ma-mf.

Figure 13A:
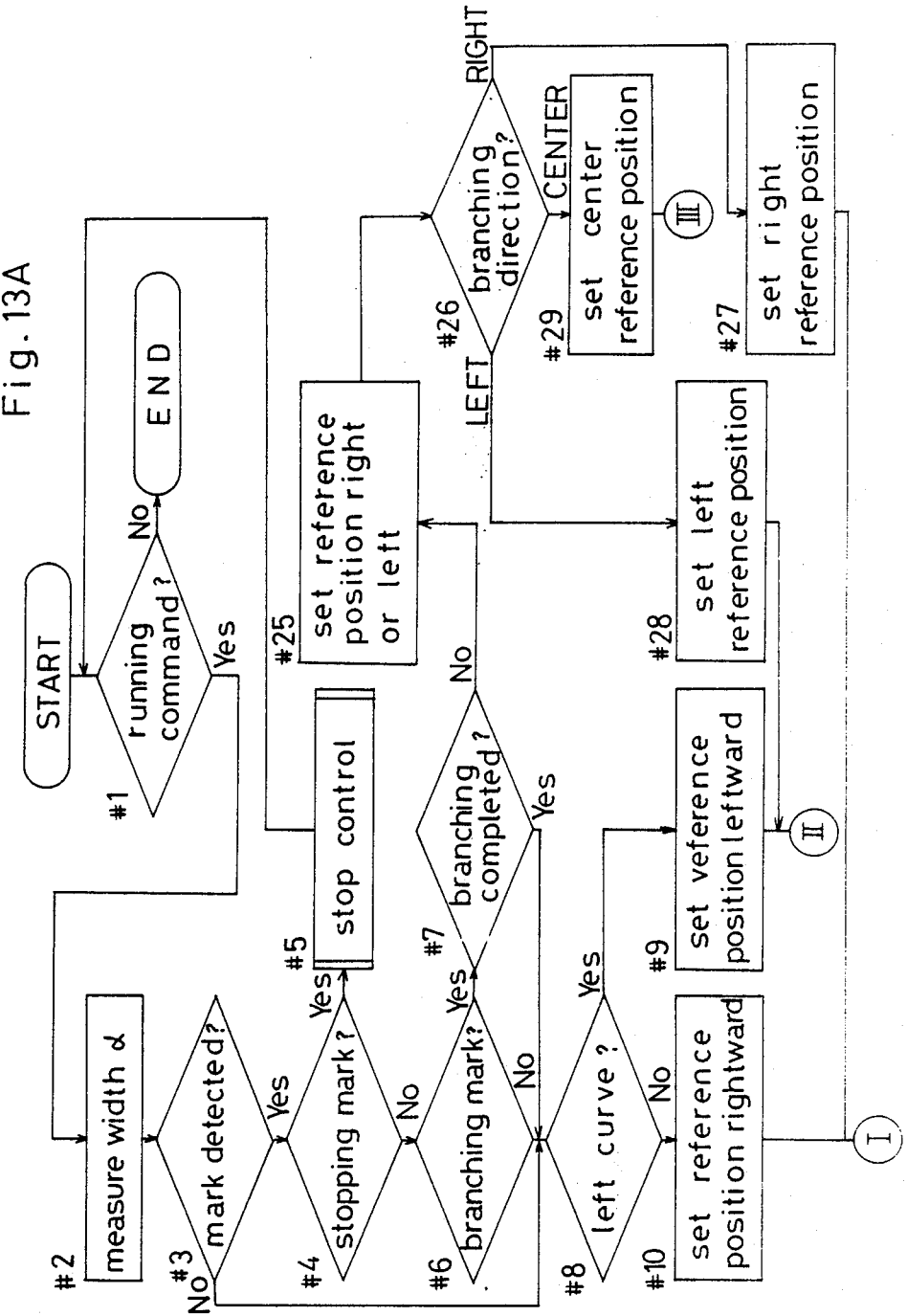
FIGS. 13A and 13B are a flowchart showing an operation of the control system of FIG. 10, FIGS. 14 (a) and (b) are explanatory views showing a relationship between a reference position and a boundary in a right edge guide operation for the sensor of FIG. 10, FIGS. 15 (a) and (b) are explanatory views showing a relationship between a reference position and a boundary in a left edge guide operation for the sensor of FIG. 10, FIGS. 16A and 16B are a flowchart of a displacement calculating operation for center branching according to the control system of FIG. 10, FIGS. 17(a), (b) and (c) are explanatory views showing sensor actuating areas in the center branching according to the control system of FIG. 10.
Figure 13B:
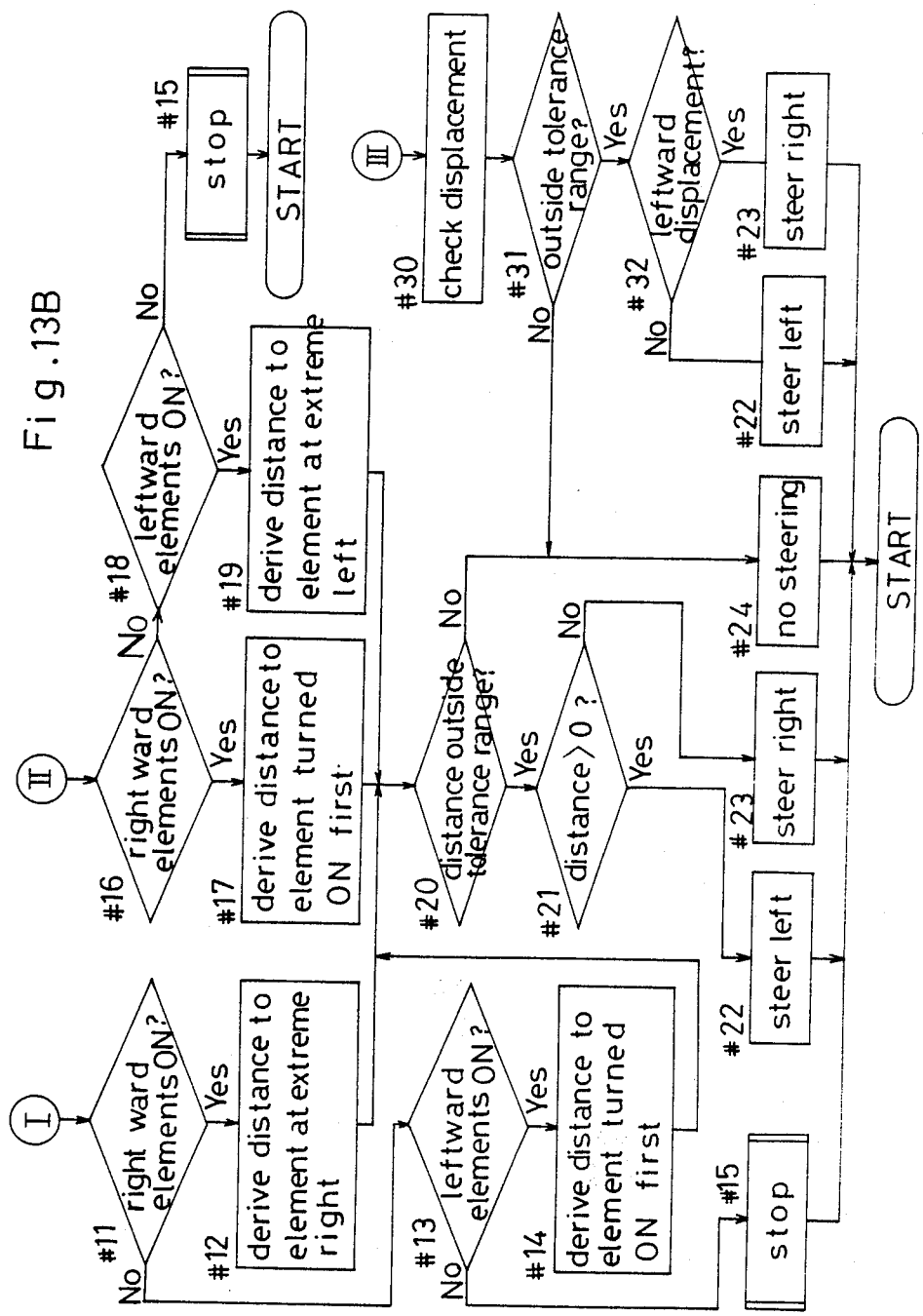

Next, steering control means 100 and reference position setting means 101 will particularly be described with reference to the operation of the control unit G and to the flowchart of FIGS. 13A and 13B.

The conveyor cart A starts running upon receipt of a running command, and then the width M of sensor actuating area α is measured on the basis of positions of the magnetism sensing elements (Steps 1 and 2). Next, whether a mark m is detected or not is judged from the detection data provided by the marks sensor 7. If a stopping mark is detected, the stop control is effected to stop the cart A at a predetermined position. The cart A is loaded or unloaded at a station St, and waits for a running command with all controls suspended during this time (Steps 3-5).

If a branch starting mark is detected, a branching operation to be described later is carried out. When a branching completion mark is detected or no mark is detected, the steering control is provided for causing the conveyor cart to automatically run along the righthand edge or lefthand edge of the guiding line L as described later (Steps 6 and 7).

In order to decide whether to cause the cart to follow the righthand edge or the lefthand edge of the guiding line L, judgment is made from destination data received through the communication units 1a, 1b and from pre-stored running track data whether the guiding line L in a next track section to run curves leftward or not (Step 8).

If the guiding line L curves leftward, the reference position SK is set to the position displaced leftward by half (M/2) the width of the sensitive range a with respect to the centerline of the steering control sensor 6. And a left edge guide operation is carried out for effecting a steering control in response to a difference between this reference position and the lefthand boundary K. If the guiding line L does not curve leftward, that is if the guiding line L curves rightward or extends straight, the reference position SK is set to the position displaced rightward by half (M/2) the width of the sensitive range a with respect to the centerline of the steering control sensor 6. And a right edge guide operation is carried out for effecting the steering control in response to a difference between this reference position and the righthand boundary K (Steps 9 and 10).

In other words, the operation for measuring the width of the sensor actuating area α and the operation for setting the reference position SK rightward or leftward to cause the conveyor cart to follow either the right edge or left edge of the guiding line L correspond to the operation of the reference position setting means 101.

Figure 14:
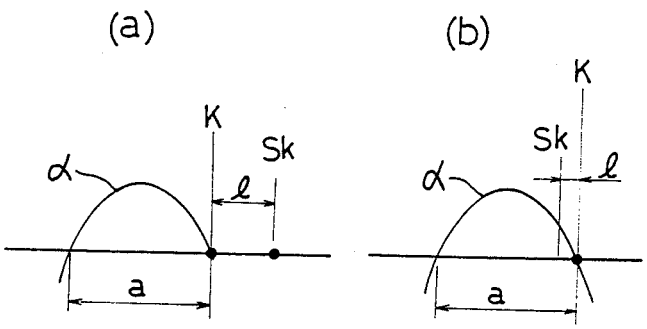

The right edge guide operation is carried out as follows. Checking is made whether there are any magnetism sensing elements turned on rightward from the reference position SK. If there are, it is judged to be a leftward deviation and (see FIG. 14 (a)) a distance 1 between the reference position S and a magnetism sensing element at a righthand end of the turned-on elements, namely the right boundary K, is derived from the number of elements turned on rightward from the reference position SK and intervals among these elements (Steps 11 and 12).

If no magnetism sensing element is turned on rightward from the reference position S, checking is made whether there are any magnetism sensing elements turned on leftward from the reference position SK. If there are, it is judged to be a rightward deviation and (see FIG. 14 (b)) a distance l between the reference position SK and a magnetism sensing element that turned on first leftward from the reference position SK (Steps 13 and 14).

If there are no magnetism sensing elements turned on leftward or rightward of the reference position S, it is judged to be a complete deviation from the guiding line L and the cart is brought to an emergency stop (Step 15).

Figure 15:
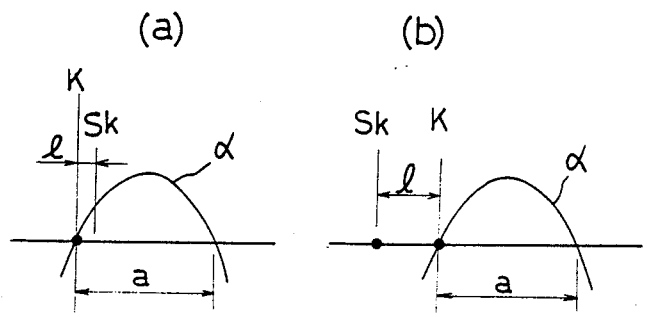

For effecting the left edge guide operation, checking is first made whether there are any magnetism sensing elements turned on rightward from the reference position SK since the reference position SK and the boundary K are located leftward compared with the case of right edge guide operation. If there are, it is judged to be a rightward deviation and (see FIG. 15 (a)) a distance l between the reference position SK and a magnetism sensing element that turned on first rightward from the reference position SK (Steps 16 and 17).

If no magnetism sensing element is turned on rightward from the reference position SK, checking is made, as in the case of right edge guide operation, whether there are any magnetism sensing elements turned on leftward from the reference position SK. If there are, it is judged to be a leftward deviation and (see FIG. 15 (b)) a distance l between the reference position SK and a magnetism sensing element at a lefthand end of the turned-on elements, namely the left boundary K, is derived (Steps 18 and 19).

If there are no magnetism sensing elements turned on leftward or rightward of the reference position SK, it is judged to be a complete deviation from the guiding line L and the cart is brought to an emergency stop as in the case of right edge guide operation.

In each of these guide operations, checking is made on the basis of distance l between the reference position SK and the boundary K whether a displacement of the conveyor cart A with respect to the guiding line L is within a predetermined tolerance range or not. If the displacement or distance l is outside the tolerance range, the cart is steered rightward or leftward according to its sign, that is whether the cart is displaced leftward or rightward. If the displacement is within the tolerance range, the steering operation is stopped (Steps 20–24).

Thereafter, the conveyor cart runs automatically until the running command ceases, by repeating the sequence starting with Step 1.

The branching operation for causing the conveyor cart to run automatically through the junction CR will be described next.

When the conveyor cart A is judged to have arrived at a branching start point at Steps 6 and 7, a pair of left and right branching reference positions SL and SR are set at positions displaced rightward and leftward from a magnetism sensing element at the centerline of the sensor by half the width M of the sensor actuating area $\alpha$, respectively, as in the foregoing case of reference position SK. A branching direction (left, right or center) is judged from the destination data received through the communication units 1a, 1b and the pre-stored running track data (Steps 25 and 26).

If the branching direction is either leftward or rightward, one of the branching reference positions SL or SR is set as the foregoinI reference position SK for normal running, according to the branching direction. In the case of rightward branching, the control proceeds to Step 11 for the right edge guide operation. In the case of leftward branching, the control proceeds to Step 16 for the left edge guide operation. As a result, the conveyor cart is controlled to automatically run along the guiding line L following either the right edge or left edge thereof to branch rightward or leftward (Steps 27 and 28).

When the conveyor cart runs along the middle line past a junction CR where the guiding line branches into three lines, center branching reference positions SL$-\Delta$ and SR$+\Delta$ are set laterally outwardly of the branching reference positions SL and SR by a predetermined width $\Delta$, respectively. These center branching reference positions SL$-\Delta$ and SR$+\Delta$ and the detection data provided by the steering control sensor 6 provide bases for calculating a center branching displacement to be particularly described later. Thereby a displacement (Y-X)/2 with respect to the guiding line L is derived, and on the basis of its range and direction it is determined whether there is a displacement and, if there is, in which direction. Then the operation proceeds to one of Steps 22 to 24 for the steering control (Steps 29–32).

Figure 16A:
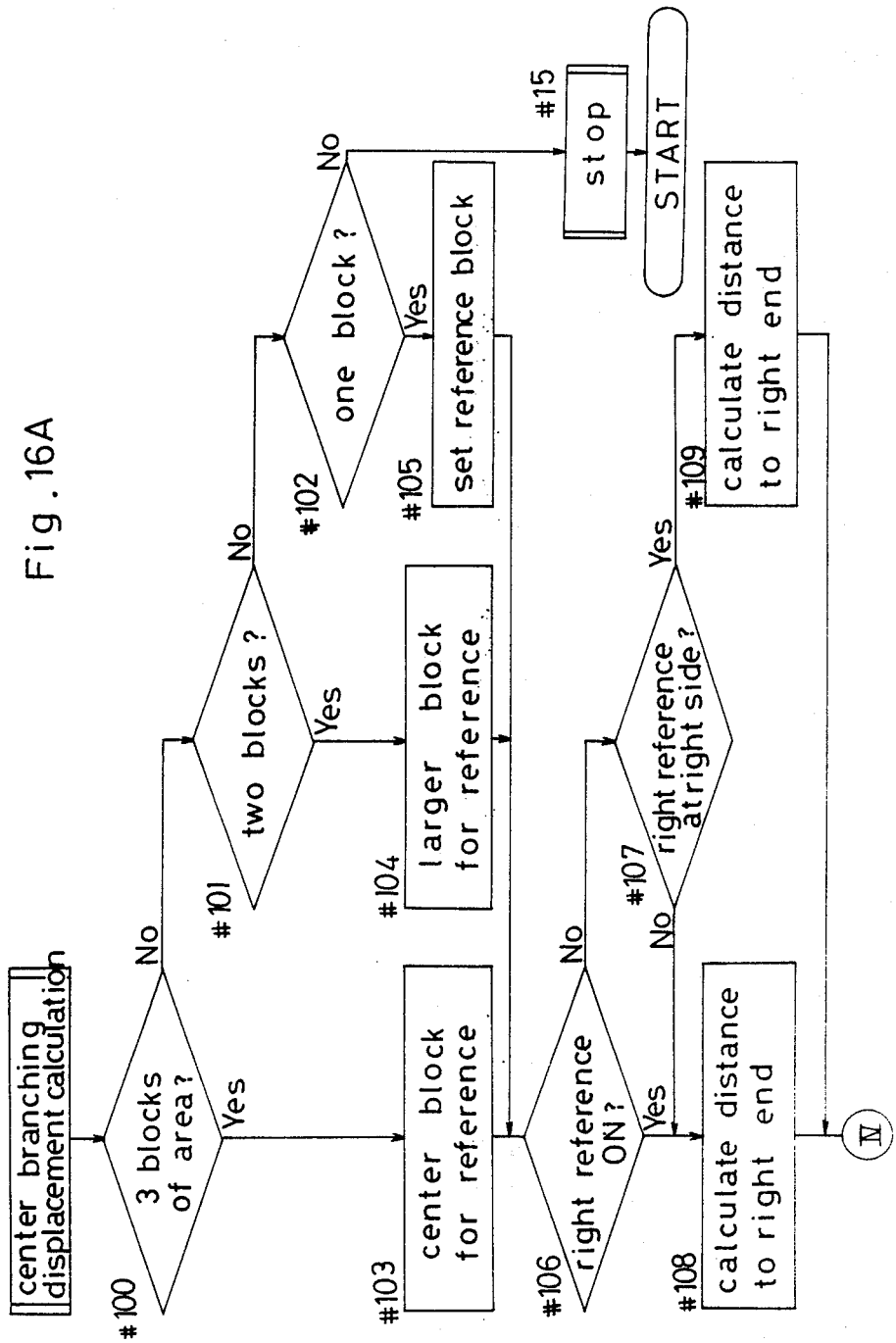
Figure 16B:
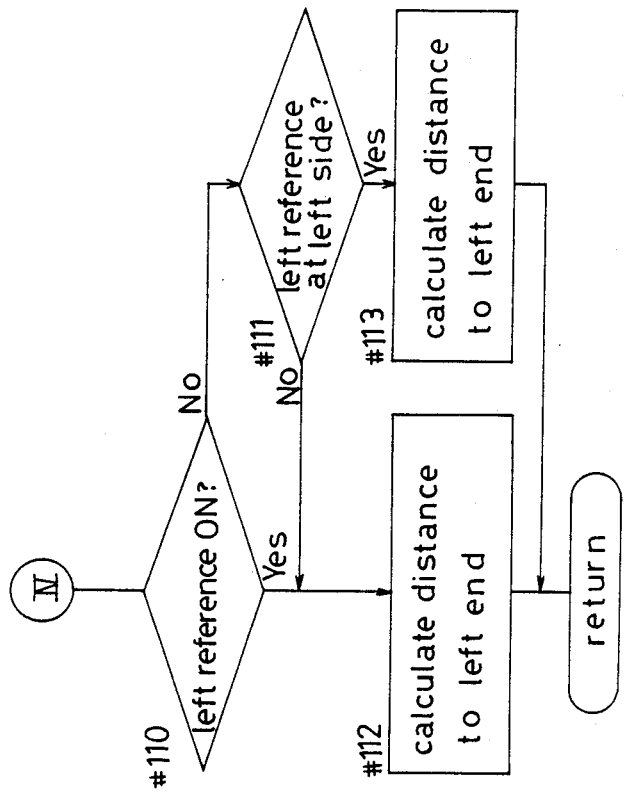

The process for calculating the center branching displacement will be described with reference to FIG. 16. The position of the conveyor cart A is determined on the basis of the number of blocks of the sensor actuating area $\alpha$, i.e. whether the cart is adjacent a three-way branching point of the guiding line L (FIG. 17 (a)), at an intermediate position after the branching (FIG. 17 (b)), or adjacent a branching completion point (FIG. 17 (c))(Steps 100–102).

If no sensor actuating area is found, the cart is judged to have completely deviated from the lines. Then the operation proceeds to Step 15 for the emergency stop.

If there are three blocks of the sensor actuating area $\alpha$, a center block is selected as reference block for judging displacements. If there are two blocks, the block having a greater width is selected as reference block. If there is only one block, this block is selected as reference block (Steps 103–105).

Next, checking is made whether the conveyor cart A is displaced leftward or rightward with respect to the center guiding line Lc and a distance of displacement X or Y is calculated by determining whether or not the magnetism sensing elements at the leftward and rightward center branching reference positions SL$-\Delta$ and SR$+\Delta$ are turned on within the reference block, and whether or not the center branching reference positions SL$-\Delta$ and SR$+\Delta$ are at ends of the reference block.

More particularly, when the magnetism sensing element at the rightward center branching reference position SR$+\Delta$ is turned on in the reference block and when the rightward center branching reference position SR$+\Delta$ is not at the righthand side of the reference block, a distance (X$=-$lR) between the rightward center branching reference position SR$+\Delta$ and an element turned on at the righthand end of the reference block is calculated. When the element at the rightward center branching reference position SR$+\Delta$ is rightwardly outside the reference block, a distance (X$=+$lR) between the rightward center branching reference position SR+Δ and an element turned on at the righthand end of the reference block is calculated (Steps 106–109).

Similarly, when the magnetism sensing element at the leftward center branching reference position SL−Δ is turned on in the reference block and when the leftward center branching reference position SL−Δ is not at the lefthand side of the reference block, a distance (Y=−1L) between the leftward center branching reference position SL−Δ and an element turned on at the lefthand end of the reference block is calculated. When the element at the leftward center branching reference position SL−Δ is leftwardly outside the reference block, a distance (Y=+1L) between the leftward center branching reference position SL−Δ and an element turned on at the lefthand end of the reference block is calculated (Steps 110–113).

The displacement with respect to the center guiding line Lc is derived on the basis of an average ((Y-X)/2) of differences in the distances X and Y at the right and left sides calculated through the above operations. Then at Steps 31 and 32 the steering controls are effected in accordance with the range and direction of displacement to permit the conveyor cart to automatically run only along the center guiding line Lc.

Thus, the reference position SK for judging the displacement with respect to the guiding line L is automatically set according to the direction of running track of the conveyor cart A and on the basis of the width M of the sensor actuating area. This permits the cart to follow the lefthand or righthand edge of the guiding line L even when running along a curving section of the track or past the junction CR for branching. The cart A is advantageously guided with accuracy also when running along the center guiding line LC through the junction CR for three-way branching. THis is made possible in spite of variations in the number and width of guiding lines or sensor actuating areas, by automatically setting the reference positions SL−Δ and SR+Δ for steering controls as described.

Figure 18:
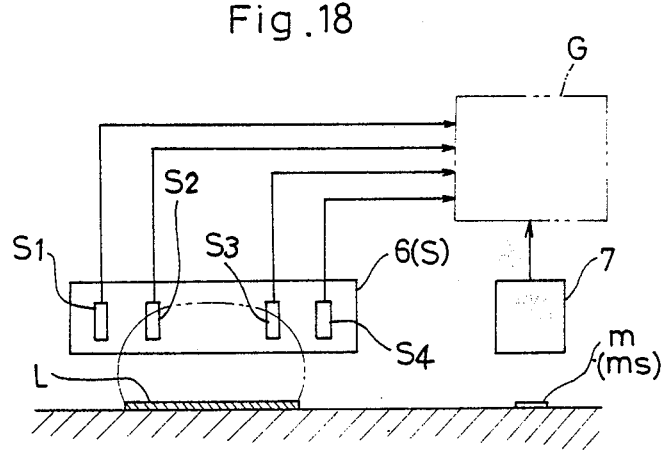
FIG. 18 is a partial block diagram of a further control system and sensor construction.

The steering control sensor 6 may be modified as shown in FIG. 18. This steering control or guiding line sensor 6 comprises four magnetism sensitive switches S1–S4 arranged transversely of the conveyor cart. Two of the switches S2 and S3 are disposed above positions of the guiding line L inwardly of the left and right edges thereof, and the other two switches S1 and S4 above positions of the guiding line L outwardly of the left and right edges, when the sensor 6 has its centerline over the centerline of the guiding line L. The control unit G judges the position of sensor 6 relative to the guiding line L transversely of the conveyor cart from an ON/OFF combination of the four switches S1–S4.

Each time the mark sensor 7 detects the marks m including the stopping marks, the control unit G switches the guiding line sensor 6 and carries out the steering operation in response to the instructions received through the communication units 1a, 1b. This enables the conveyor cart to automatically run following the left edge or right edge of the guiding line L, and to branch off or merge in selected directions at junctions CR.

When running sections of the track along the guiding line L other than junctions CR, the conveyor cart is steered on the basis of ON/OFF combinations of all the four switches S1–S4 as shown in Table I below. More particularly, the cart is steered such that the two switches S2 and S3 disposed above the positions in-wardly of the guiding line L are maintained operative. In Table I, "0" corresponds to the OFF state of the switches S1–S4, and "1" the ON state. The slashes signify impossible situations to be ignored.

TABLE I

| S1 | S2 | S3 | S4 | Steer |
|----|----|----|----|-------|
| 0 | 0 | 0 | 0 | off line |
| 0 | 0 | 0 | 1 | right |
| 0 | 0 | 1 | 0 | right |
| 0 | 0 | 1 | 1 | right |
| 0 | 1 | 0 | 0 | left |
| 0 | 1 | 0 | 1 | — |
| 0 | 1 | 1 | 0 | center |
| 0 | 1 | 1 | 1 | right |
| 1 | 0 | 0 | 0 | left |
| 1 | 0 | 0 | 1 | — |
| 1 | 0 | 1 | 0 | — |
| 1 | 0 | 1 | 1 | — |
| 1 | 1 | 0 | 0 | left |
| 1 | 1 | 0 | 1 | — |
| 1 | 1 | 1 | 0 | left |
| 1 | 1 | 1 | 1 | |

Next, the steering control effected for branching at the junction CR will be described next.

When the conveyor cart A approaches the junction CR and the mark sensor 7 detects a mark m, switching is made in accordance with an instruction as to the branching direction to employ detection data provided by only the two lefthand switches S1 and S2 or the two righthand switches S3 and S4 for a time period required for the cart A to pass through the junction CR. Thus the cart is steered to follow the left edge or right edge of the guiding line L. In the case of leftward branching, the cart passes through the junction CR following the left edge of the line L. In the case of rightward branching, the cart follows the right edge. Tables II and III below show details of the respective steering modes for the branching.

TABLE II

| | (leftward) | |
|----|----|-------|
| S1 | S2 | Steer |
| 0 | 0 | right |
| 0 | 1 | center |
| 1 | 0 | left |
| 1 | 1 | left |

TABLE III

| | (rightward) | |
|----|----|-------|
| S3 | S4 | Steer |
| 0 | 0 | left |
| 0 | 1 | right |
| 1 | 0 | center |
| 1 | 1 | right |

In these tables, as in the foregoing Table I, "0" corresponds to the OFF state of the magnetism sensitive switches S1–S4 and "1" to the ON state.

The steering control for causing the conveyor cart A to run along a merging line will not be described here since it is effected similarly to the above steering control for branching at the junction CR.

The above embodiment exemplifies the case of causing the conveyor cart to automatically run past the junction where one guiding line branches from or merges into another guiding line. It is possible to cause the cart to automatically run past a junction where two lines Lb and Lc branch leftward and rightward from a main guiding line La, along any one of the three lines La, Lb and Lc.

When the conveyor cart A is caused to run along either of the two lines Lb and Lc branching leftward or rightward from the main guiding line La, the cart is steered to follow the left edge or right edge of the guiding line L according to the branching direction as shown in Table I and II.

When the cart A is caused to run past the junction along the main guiding line La without branching leftward or rightward, the steering control employs all of the detection data provided by the four magnetism sensitive switches S1–S4. Then, the cart is steered in a direction opposite to one of the end switches S1 and S4 changing from ON state to OFF state, with the two intermediate switches S2 and S3 maintained in ON state.

The foregoing magnetism sensitive switches may be replaced with magnetism sensitive elements such as Hall elements. Such a steering control sensor 6 as employed in this embodiment is very simple in construction and yet permits the conveyor cart A to run with accuracy along the guiding line L through a merging or branching point.

In the foregoing embodiments, the guiding line L comprises a thin sheet of resin mixed with a magnetic material and placed along the running track. This guiding line L may have various constructions as hereinafter described.

Figure 19:
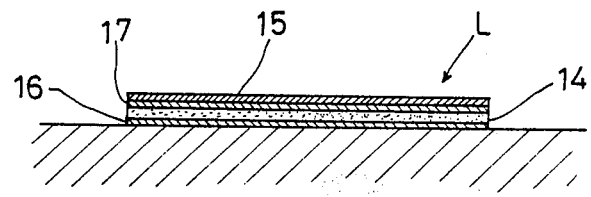
FIG. 19 is a front view in vertical section of a modified guiding line.

Referring to FIG. 19, the guiding line L shown therein comprises a belt-like resin layer 14 consisting of a resin (such as nitrile rubber) mixed with a particulate magnetic material (such as ferrite), and a non-magnetic protective layer 15 superposed on an upper surface of the resin layer 14. An adhesive portion 16 is formed on an undersurface of the resin layer 14 by applying an adhesive taper or agent thereto.

The non-magnetic protective layer 15 comprises a resin such as vinyl chloride resin in belt form, which is bonded to the resin layer 14 through an adhesive portion 17 formed by applying an adhesive tape or agent.

The material for forming the non-magnetic protective layer 15 may be selected from various resins and non-magnetic metals such as aluminum which provide improved wear and weather resistance. The means for bonding the resin layer 14 and the non-magnetic protective layer 15 is also variable in many ways.

The guiding line L as constructed above has the advantage of being proof against wear and damage through use and against early deterioration.

Figure 20:
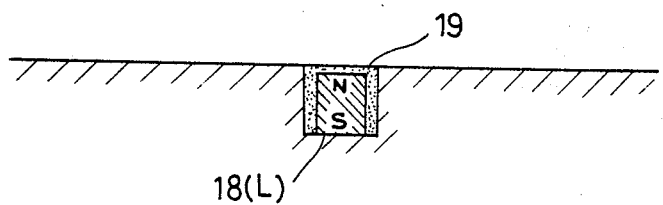
FIG. 20 is a front view in vertical section of a further example of guiding line.

FIG. 20 shows another example of guiding line L. This guiding line L comprises a resin belt 18 mixed with a magnetic material, which is smaller in width than in thickness, and is magnetized to have an upper face defining N-pole and a lower face defining S-pole. The belt 18 is embedded in a position slightly below the running track surface, and is peripherally covered by a resin mortar or epoxy resin 19. Accordingly the guiding line L may readily be formed with the same belt 18 at straight sections and curved sections.

More particularly, the belt 18 having a reduced width simplifies an embedding operation of the guiding line L, and the lowering of magnetism due to the reduced width is compensated for by the thickness of belt 18. The conveyor cart A normally has a wheel size not less than 200 mm, and therefore the narrow belt 18 is free from being trampled down by the conveyor cart A running across the guiding line L. Further, even if there occurs a slight level difference between the position where the belt 18 is embedded and the track surface, it will not impair running of the conveyor cart A. Thus, the guiding line L as constructed above has a greatly increased durability.

The guiding line L so far described comprises a magnetic tape mainly. Instead of this construction, an optical guiding system may be employed by replacing the magnetic tape with a light reflecting tape and providing an photosensor as the steering control sensor 6 for detectiang intensity of a reflected light.

The light reflecting tape may comprise color tapes of different colors, with the steering control sensor 6 comprising a photosensor sensitive to the different colors. The photosensor may comprise an image sensor sensitive to color changes or to a subtle difference in the intensity of reflected light. Thus, the guiding mode may be varied in many ways.

Furthermore, in the described embodiments, the marks m comprise a plurality of permanent magnets for providing the conveyor cart A with various running control data. The magnetic poles of these magnets are arranged in various ways to consitute the marks. Also the marks installed at their respective positions comprise combinations of presence and absence of the permanent magnets. This arrangement may also be varied in many ways. For example, the marks may be the optical type comprising combinations of light reflecting tapes arranged variously to output the running control data. The ground communication units 1a may be disposed adjacent stopping positions and branching/merging points, whereby the conveyor cart receives the running control data through the ground communication units 1a and the communication unit 1b mounted on the cart.

The specific constructions of the elements for causing the conveyor cart A to run automatically are not limited to the foregoing embodiments, but may be varied in many ways according to the conveyor carts to which the present invention is applicable.

What is claimed is:

1. A vehicle running control system comprising a guiding line (L) extending along a running track, and a conveyor cart (A), the conveyor cart (A) including detecting means (6) for detecting the guiding line (L) and outputting detection data and steering control means operable in response to the detection data for permitting the conveyor cart (A) to automatically run along the guiding line (L), said detecting means (6) is switchable for selectively detecting right and left edges of said guiding line (L) wherein said detecting means (6) includes a plurality of resistances (R) connected in series and a plurality of magnetism sensitive elements operable to connect connection points of said resistances (R) to a common electric potential and said guiding line (L) comprises a magnetic tape.

2. A vehicle running control system as claimed in claim 1 wherein said guiding line (L) includes a priority line (La) and a non-priority line (Lb) merging with said priority line (La) such that said conveyor cart (A) running along said priority line (La) is caused to run with priority over another conveyor cart (A) running on said non-priority line (Lb), and wherein said conveyor cart (A) includes priority signal emitting means (11) for emitting a priority signal (P) to said another conveyor cart (A) to indicate a priority running state, receiving means (12) for receiving the priority signal (P) and stopping control means for causing said conveyor cart (A) to make an emergency stop when said conveyor cart (A) is running on said non-priority line (Lb) and said receiving means (12) receives said priority signal (P), and wherein said vehicle running control system further comprises deceleration control means for decelerating said conveyor cart (A) on said non-priority line (Lb) and when said conveyor cart (A) on said non-priority line (Lb) arrives at a position short of a point at which said nonpriority line (Lb) merges with said priority line (La), thereafter said conveyor cart (A) being stoppable by said stopping control means for an emergency stop.

3. A vehicle running control system as claimed in claim 1 wherein said guiding line (L) defines a sensor actuating area transversely of the conveyor cart (A) to be detected by said detecting means (6) mounted on the conveyor cart (A), and said steering control means is operable in response to the detection data provided by said detecting means (6) to cause a boundary (K) between a sensing range (a) of said detecting means (6) which has detected said sensor actuating area and a non-sensing range (b) thereof to approach a preset reference position (SK), said system further comprising reference position setting means (101) for setting said reference position (SK) in accordance with a width of said sensing range (a) so that said boundary (K) coincides with said reference position (SK) when the conveyor cart (A) is in a proper position relative to said guiding line (L).

4. A vehicle running control system as claimed in claim 1, wherein said magnetism detecting means (6) further includes switch means (SW) for selecting one of opposite ends of said resistances (R) to detect a resistance value with respect to said common electric potential.

5. A vehicle running control system as claimed in claim 4 wherein said resistances (R) are arranged such that said resistance value detected remains the same when directions for detecting said resistance value are switched by said switch means (SW) with the conveyor cart (A) maintained in the proper position relative to the guiding line (L), and wherein said steering control means is operable to cause a difference between a preset reference resistance value and the resistance value detected by said magnetism detecting means (6) to approach zero.

6. A vehicle running control system as claimed in claim 4 further comprising control marks (m) disposed alongside said guiding line (L), each of said control marks (m) including a plurality of magnetic pieces (m1-m6) having magnetic poles combined to provide control data for controlling said conveyor cart (A), and a trigger magnetic piece (mT) having a magnetic pole opposite to a magnetic pole of said guiding line (L) for indicating a read position of said control marks (m).

7. A vehicle running control system as claimed in claim 6 wherein said magnetic pieces (m1-m6) are arranged longitudinally of said conveyor cart (A).

8. A vehicle running control system as claimed in claim 7 wherein said magnetic pieces (m1-m6) are arranged transversely of said conveyor cart (A).

9. A vehicle running control system as claimed in claim 4 wherein said magnetic tape includes a non-magnetic protective layer (15) placed on an upper surface thereof.

10. A vehicle running control system as claimed in claim 9 wherein said non-magnetic protective layer (15) is formed of a resin.

* * * * *